United States Patent [19]
Griffith et al.

[11] Patent Number: 4,661,077
[45] Date of Patent: Apr. 28, 1987

[54] LIFESAVING AND MOORING DEVICE

[75] Inventors: Bruce S. Griffith, Tampa, Fla.; James F. Ward, c/o Original Safety Line Plus; P.O. Box 310136, Tampa, Fla. 33680

[73] Assignee: James F. Ward, Tampa, Fla.

[21] Appl. No.: 780,726

[22] Filed: Sep. 27, 1985

Related U.S. Application Data

[63] Continuation of Ser. No. 632,611, Jul. 19, 1984, abandoned.

[51] Int. Cl.⁴ .............................................. B63C 9/00
[52] U.S. Cl. ..................................... 441/84; 114/230; 441/80
[58] Field of Search ..................... 114/230; 441/80, 84, 441/85

[56] References Cited

U.S. PATENT DOCUMENTS

| Re. 29,728 | 8/1978 | Franklin | 114/230 |
|---|---|---|---|
| 896,037 | 8/1908 | Neely | 114/230 |
| 2,088,251 | 7/1937 | Walters | 441/85 |
| 3,094,755 | 6/1963 | Casanave | 114/230 |
| 3,512,223 | 5/1970 | Willinger | 114/230 |
| 3,863,591 | 2/1975 | Wild | 114/230 |
| 4,109,603 | 8/1978 | Guthmann | 114/230 |
| 4,190,011 | 2/1980 | Guthman | 114/230 |

FOREIGN PATENT DOCUMENTS 470816 8/1937 United Kingdom .................. 441/85

Primary Examiner—Joseph F. Peters, Jr.
Assistant Examiner—Ed Swinehart
Attorney, Agent, or Firm—Marks Murase & White

[57] ABSTRACT

The invention discloses a lifesaving and mooring device (8) having a resilient, floatable member (10), defining a pair of channels (12) therethrough, adapted for slidable receipt of an elongated member, such as a rope (14) through the channels. The rope slidably passes through the channels in a U-like configuration so as to form an adjustable slip-loop (18). At least one end of the rope has a diameter greater than that of the channels so as to prevent removal of the rope therefrom.

8 Claims, 7 Drawing Figures

LIFESAVING AND MOORING DEVICE

This application is a continuation of application Ser. No. 632,611, filed July 19, 1984, now abandoned.

BACKGROUND OF THE INVENTION

The present invention relates to ship implements and particularly to lifesaving and mooring devices.

Recreational water sport and boating activities are becoming more popular in the United States. Unfortunately, with the increase in boating activity, there has also been a concomitant increase in boating accidents and tragedies, due to drowning. Many potential drowning victims do not wear lifesaving buoyant devices, and may have limited swimming or drownproofing skills. These victims must be given assistance very quickly, in order to prevent grave tragedy.

One well known way of saving a potential drowning victim is to have a rescuer enter the water and attempt to retrieve the victim. In some circumstances, this can lead to a double tragedy to both the drowning victim and the rescuer, if the water conditions are rough or if the rescuer lacks lifesaving skills. One well known way to avoid such a double tragedy is to throw a lifeline to the victim and to retract the lifeline after the victim grabs a portion thereof.

Previous lifelines have taken many forms, a simple form thereof being the well-known doughnut-shaped life ring with a line attached thereto and more complicated forms including projectile delivery systems of lines, including harpoons, and aerial balloons. Life rings are extremely difficult to throw any distance more than a few yards and more complicated forms of lifelines are better suited to commercial and military applications, due to their complicated structure and expense.

Previous inventors have attempted to solve the difficulties of throwing a life ring by constructing floatable weighted objects in shapes that are easier to throw than life rings. One such device is described in U.S. Pat. No. Re. 29,728, wherein a lifeline is fixedly attached to a weighted floatable object that may be in the shape of a football. It is contemplated that the device be thrown to a victim, who would grasp the lifeline, the floatable member, or both and be pulled to safety. If the victim is suffering from submersion shock or is panic striken, it may be extremely difficult for him to maintain a grasp upon the device. Accordingly, it is desirable that the lifesaving device have some means to affix it to the victim, in order to ensure proper retention and retraction from the water.

Another problem facing recreational boaters is that of mooring vessels to dockside. In the past, boating activity was mostly confined to military and commercial activities; the few recreational boaters were generally competent in the arts of boat mooring and knot tying. Today, both of those arts appear to be dying and a visit to any marina will show a strange conglomeration of what might be half-heartedly described as knots being used by unskilled mariners to moor boats. There has been a long-felt need in the recreational boating industry to develop a mooring line that allows easy attachment to a dockside cleat or piling, especially if it allows direct attachment to a dock cleat or a piling merely by throwing the line from a vessel deck.

Recreational boaters are also generally budget-conscious and there is a general desire to combine functions of many pieces of equipment into fewer simple and inexpensive objects. Accordingly, a device that could simultaneously function as both a mooring line and, if necessary in an emergency, as a lifesaving line, would satisfy many long-felt boater needs.

SUMMARY OF THE INVENTION

It is an object of the present invention to construct a lifeline that could be thrown great distances, by one of limited skill or athletic ability, to a potential drowning victim.

It is another object of the present invention to construct a lifeline that can be easily affixed to a potential drowning victim that may be fatigued, panic striken, or in rough seas, and who would have difficulty maintaining a grasp on such a lifeline, unless it was securely attached to said victim.

It is another object of the present invention to develop a lifeline device that can also be used as a boat mooring line that can be easily thrown from vessel deck to dockside.

It is another object of the present invention to develop a boat mooring line that can be easily attached to and removed from portions of the dock by relatively unskilled users, who could nonetheless ensure proper mooring of the boat to said dock.

Lastly, it is an object of the present invention to develop a device that can serve as both a mooring line, and when need be in case of emergency, a lifesaving device having minimal bulk, relatively lightweight construction, and great simplicity for ease of manufacture, low purchase cost and ease of maintenance.

The present invention features a resilient floatable member, such as a sponge rubber or vinyl ball, having a plurality of channels configured therethrough adapted for slidable receipt of an elongated member, such as a rope line. A line is passed through the channels in a U-shaped configuration, one end of the line having a diameter greater than those of the channels, so as to prevent removal of the line therefrom. The channels allow slidable movement of the line, to form a variable-length loop. The ball is constructed of a suitable size and weight to allow easy throwing thereof by a user to a dock or a potential drowning victim. The variable-length loop can be passed over a dock piling, or cleat, to allow easy mooring of a boat and in life-saving emergencies, the potential drowning victim may pass the loop over portions of his or her body, such as the torso or wrist, to ensure firm attachment to the lifeline, whereupon the potential victim can be retrieved to the vessel by the user.

BRIEF DESCRIPTION OF THE DRAWINGS

The invention can be better understood with reference to the accompanying drawings, forming a portion of the specification hereof wherein.

DESCRIPTION OF THE PREFERRED EMBODIMENT

Figure 1:
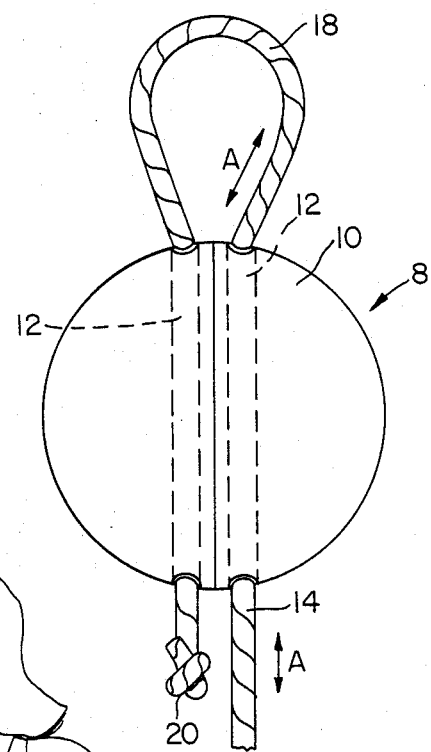
FIG. 1 is a plan view of the present invention.

Referring to FIG. 1, the invention has a floatable member or ball 10 that in a preferred embodiment assumes a spherical shape. The ball 10 may be constructed of any suitable known resilient, floatable material, but preferably a molded foamed material such as sponge rubber, latex, vinyl or urethane foam. A suitable ball diameter has been found to be four inches. The ball 10 also has a plurality of at least two parallel channels 12 therein, adapted for passage of an elongated member, such as a rope 14 therethrough in a slidable fashion.

Figure 2:
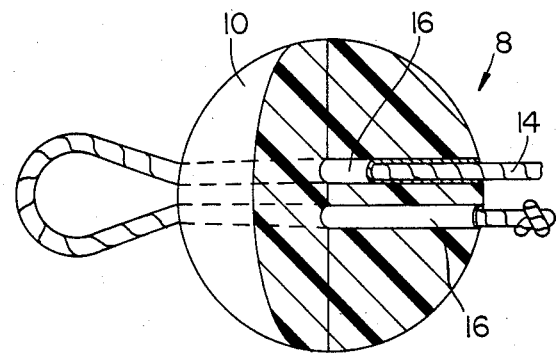
FIG. 2 is a partial section thereof.
Figure 2A:
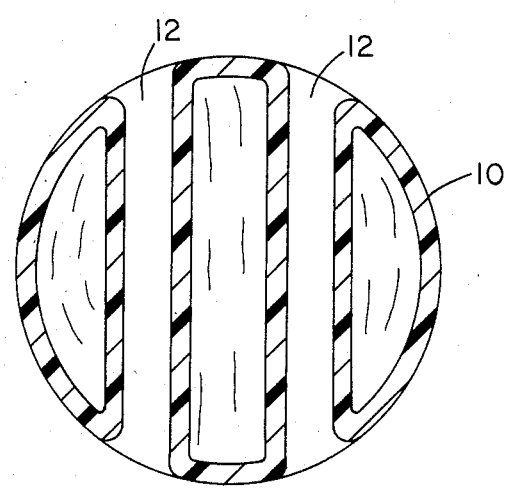
FIG. 2A is a partial section of an alternative embodiment.

As shown in FIG. 2, the parallel channels 12 preferably contain semi-rigid, resilient tubing therein, each having an inner diameter, for easy slidable passage of the rope 14 therethrough so as not to chafe the ball 10. The tubing may be advantageously constructed of plastic and may be molded in situ during fabrication of the ball 10 as is well known in the molding arts. Alternatively, as shown in FIG. 2A, the ball 10 may be molded in a hollow, floatable construction with plastic material, such as vinyl.

As can be seen in FIGS. 1 and 2, the rope 14 is passed through the tubes 16 in a U-like fashion so as to form a slip-adjustable loop 18 as indicated by the arrows "A" in FIG. 1. One end of the rope 14 is conformed to a larger diameter than the internal passage of the tubing 16, in order to prevent removal of the rope therefrom. This may be accomplished easily and inexpensively by providing the rope end with at least one knot 20. It may also be desirable to knot the other end of the rope to prevent removal of that end from the other corresponding tube 16. While any elongated member such as cable, coated cable or rope may be utilized, it is advantageous to utilize floatable rope, such as that manufactured of polypropylene or nylon having a specific gravity less than that of water.

Figure 3:
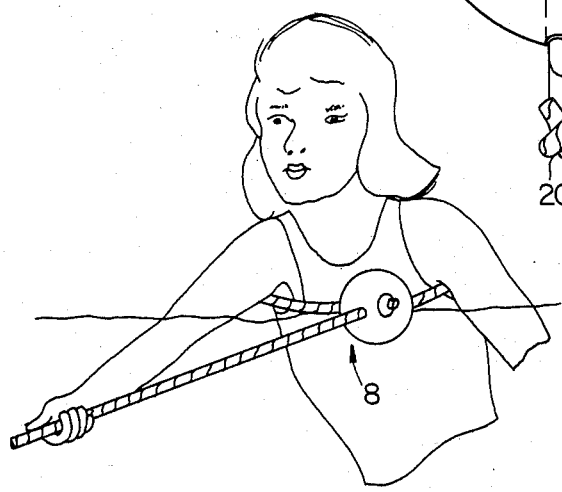
FIG. 3 shows the invention being used as a lifeline girding the torso of a potential drowning victim.
Figure 4:
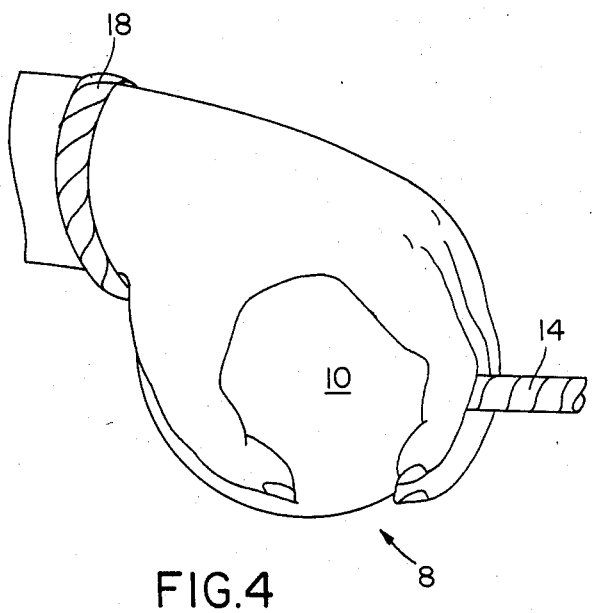
FIG. 4 shows the invention also being used as a lifeline affixed to the wrist of a potential drowning victim.

The slip-adjustable rope loop 18 allows the device to be utilized in any manner requiring affixation to an object. In FIGS. 3 and 4, the device 8 is being used as a lifeline. Referring to FIG. 3, the rope loop 18 has been passed around the torso of a potential drowning victim under her arms and provides firm attachment even in rough seas. In order to ensure easy use by the victim, the rescuer can slip open the rope loop to a large diameter, that will ensure passage over the victim and then throw the entire device over or in close proximity to the victim. The resilient construction of the ball 10 will prevent harm to the victim if he or she is struck thereby during the throw. In FIG. 4, the drowning victim has passed the rope loop 18 around his or her waist and is grasping the ball portion in the palm of the corresponding hand. The slip-loop construction will ensure that the loop 18 is self-tightening around the wrist, which will prevent inadvertent release of the device.

Figure 5:
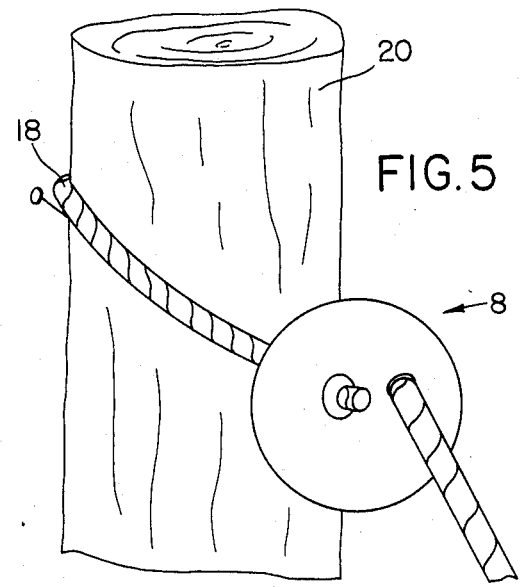
FIG. 5 shows the invention being used as a mooring line wherein the loop has been passed over a dock piling.
Figure 6:
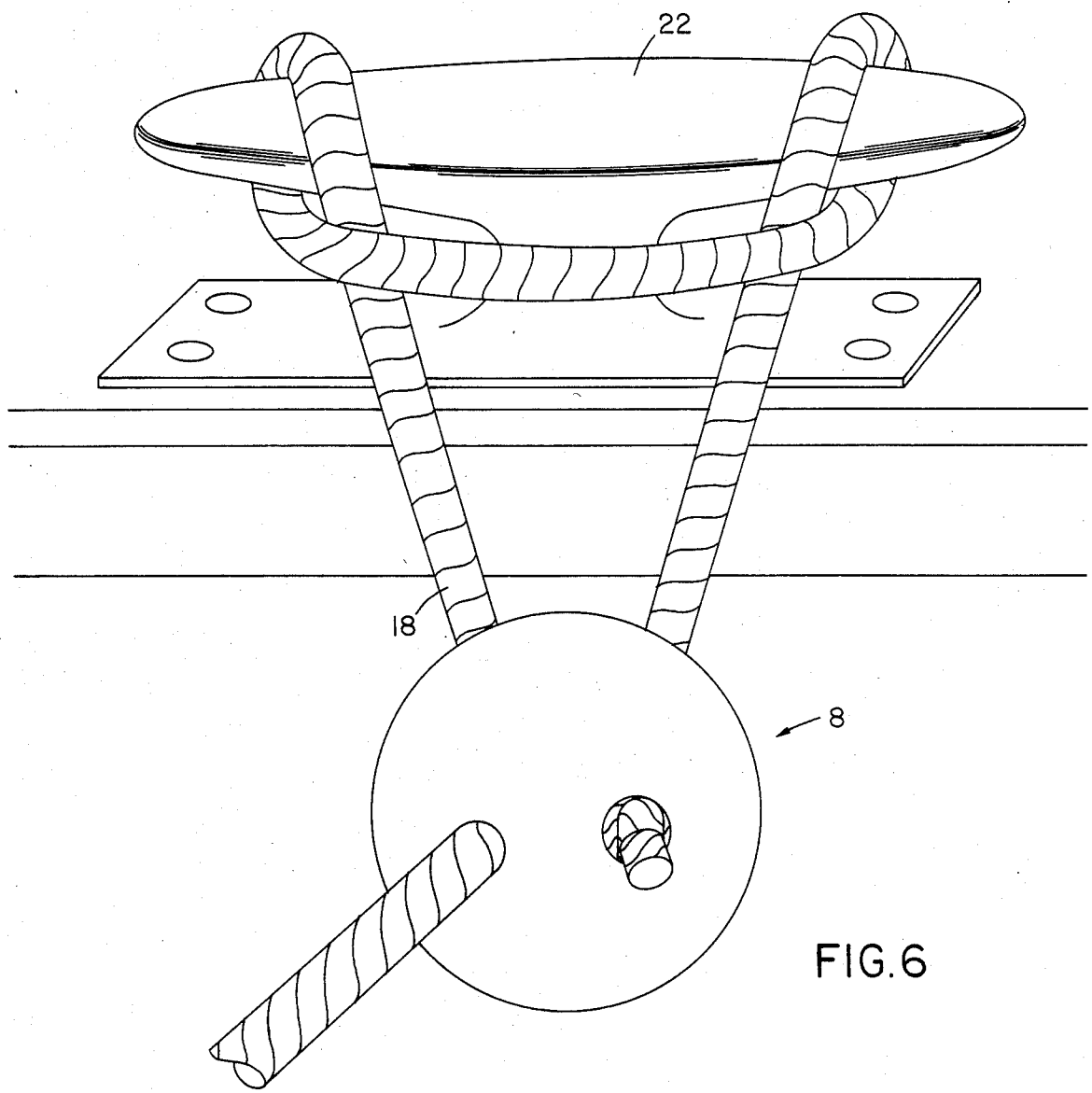
FIG. 6 shows the invention being used as a mooring line wherein the loop has been passed over a dock cleat and the ball portion is being used as a boat bumper.

In FIG. 5, the device 8 is being utilized as a mooring line by passing slip loop 18 over a dock piling 20. It follows that the loop 18 could also be passed over a cleat or any other object that would allow passage of the loop 18, such as shown in FIG. 6. The resilient structure of the ball 10 will prevent inadvertent damage to the dock or the boating vessel as the device 8 is being through from one to the other. The ball 10 may also be used as a boat bumper between a dock and a vessel, as also shown in FIG. 6. When used as a mooring or lifeline, it is contemplated that one end of the rope will be attached to the vessel.

Inasmuch as the present invention is subject to many variations, modifications and changes in detail, it is intended that all matter contained in the foregoing description or showing in the accompanying drawings shall be interpreted as illustrative and not in a limiting sense.

What is claimed is:

1. A lifesaving and mooring device comprising:
    a hollow, spherical, buoyant and resiliently deformable member of a suitable size, weight, and deformability to facilitate casting thereof without harming a person accidentally struck thereby, said hollow spherical member having a pair of channels herethrough;
    a buoyant elongated member slidably received in said channels and defining an enlargeable loop on one side of said hollow spherical member; and
    means at one end of said elongated member for preventing passage of said one end through said channels.

2. The lifesaving and mooring device as recited in claim 1 wherein said elongated member is a cable.

3. The lifesaving and mooring device as recited in claim 1 wherein said elongated member is a rope.

4. The lifesaving and mooring device as recited in claim 1 wherein said hollow spherical member is constructed of material from the group consisting of rubber, latex, vinyl, and urethane.

5. A lifesaving and mooring device comprising:
    a spherical, buoyant and resiliently deformable member of a suitable size, weight, and deformability to facilitate casting thereof without harming a person accidentally struck thereby, said spherical buoyant member having a pair of tubular members disposed in channels passing through said spherical buoyant member;
    a buoyant elongated member slidably received in said pair of tubular members and defining an enlargeable loop on one side of said spherical buoyant member; and
    means at one end of said elongated member for preventing passage of said one end through said tubular members.

6. The lifesaving and mooring device as recited in claim 5 wherein said elongated member is a cable.

7. The lifesaving and mooring device as recited in claim 5 wherein said elongated member is a rope.

8. The lifesaving and mooring device as recited in claim 5 wherein said spherical buoyant member is constructed of a material from the group consisting of rubber, latex, vinyl, and urethane.

* * * * *

UNITED STATES PATENT AND TRADEMARK OFFICE
CERTIFICATE OF CORRECTION

PATENT NO. : 4,661,077
DATED : April 28, 1987
INVENTOR(S) : Bruce S. Griffith & James E. Ward It is certified that error appears in the above—identified patent and that said Letters Patent is hereby corrected as shown below:

Title page:

Item [75], Please change the second inventor's name to read --James E. Ward-- instead of "James F. Ward";

Item [73], Please change the assignee's name to read --James E. Ward-- instead of "James F. Ward".

Signed and Sealed this

Fifteenth Day of December, 1987

Attest:

DONALD J. QUIGG

Attesting Officer      Commissioner of Patents and Trademarks